April 17, 1951 C. F. KRAMER 2,549,102
TRUCK CAB SUSPENSION
Filed Feb. 14, 1946 3 Sheets-Sheet 1

CLARENCE F. KRAMER
INVENTOR.

BY
ATTORNEYS.

April 17, 1951  C. F. KRAMER  2,549,102
TRUCK CAB SUSPENSION
Filed Feb. 14, 1946  3 Sheets-Sheet 2

CLARENCE F. KRAMER
INVENTOR.

BY C.C. McRae.
R.G. Harris.
J.R. Faulkner.
T.H. Oster.
ATTORNEYS

April 17, 1951　　　　C. F. KRAMER　　　　2,549,102
TRUCK CAB SUSPENSION

Filed Feb. 14, 1946　　　　　　　　　　　　3 Sheets-Sheet 3

CLARENCE F. KRAMER
INVENTOR.

BY　C. C. McRae
　　R. G. Harris
　　J. R. Faulkner
　　T. H. Oster
　　ATTORNEYS

Patented Apr. 17, 1951

2,549,102

UNITED STATES PATENT OFFICE 2,549,102

TRUCK CAB SUSPENSION

Clarence F. Kramer, Birmingham, Mich., assignor to Ford Motor Company, Dearborn, Mich., a corporation of Delaware Application February 14, 1946, Serial No. 647,577

3 Claims. (Cl. 296—35)

This invention is concerned with a method and means for suspending a truck cab from a truck frame.

An object of this invention is to provide a new and improved method and apparatus for fastening a truck cab to the truck frame. This invention is designed to eliminate the transmission of strain from the truck frame to the cab and has particular reference to the strain resulting from twisting of the frame.

Truck cab bodies have heretofore been mounted upon truck frames by means of bolts, but with a spring interposed between the cab and frame. Conventionally this spring has taken the usual helical form with the mounting bolt arranged axially within the helix. This yielding type of mounting has been necessitated by the substantial amount of twist which occurs in the long frames of present day trucks due to uneven loading and road irregularities. If the cab were rigidly secured to the frame at all four corners, any twisting in the frame would necessarily be communicated directly to the body and engender noise and binding in the doors and windows. The use of the spring mounting mentioned above satisfactorily eliminated twist in the cab, but introduced a new source of trouble due to noise and wear occasioned by the reciprocation of the bolt in the bolt hole.

The present invention retains the advantages of former yielding mountings and eliminates the noise and wear associated therewith. The invention is probably best understood by reference to the drawings which depict the mountings for the rear edge of a truck cab.

Figure 3:
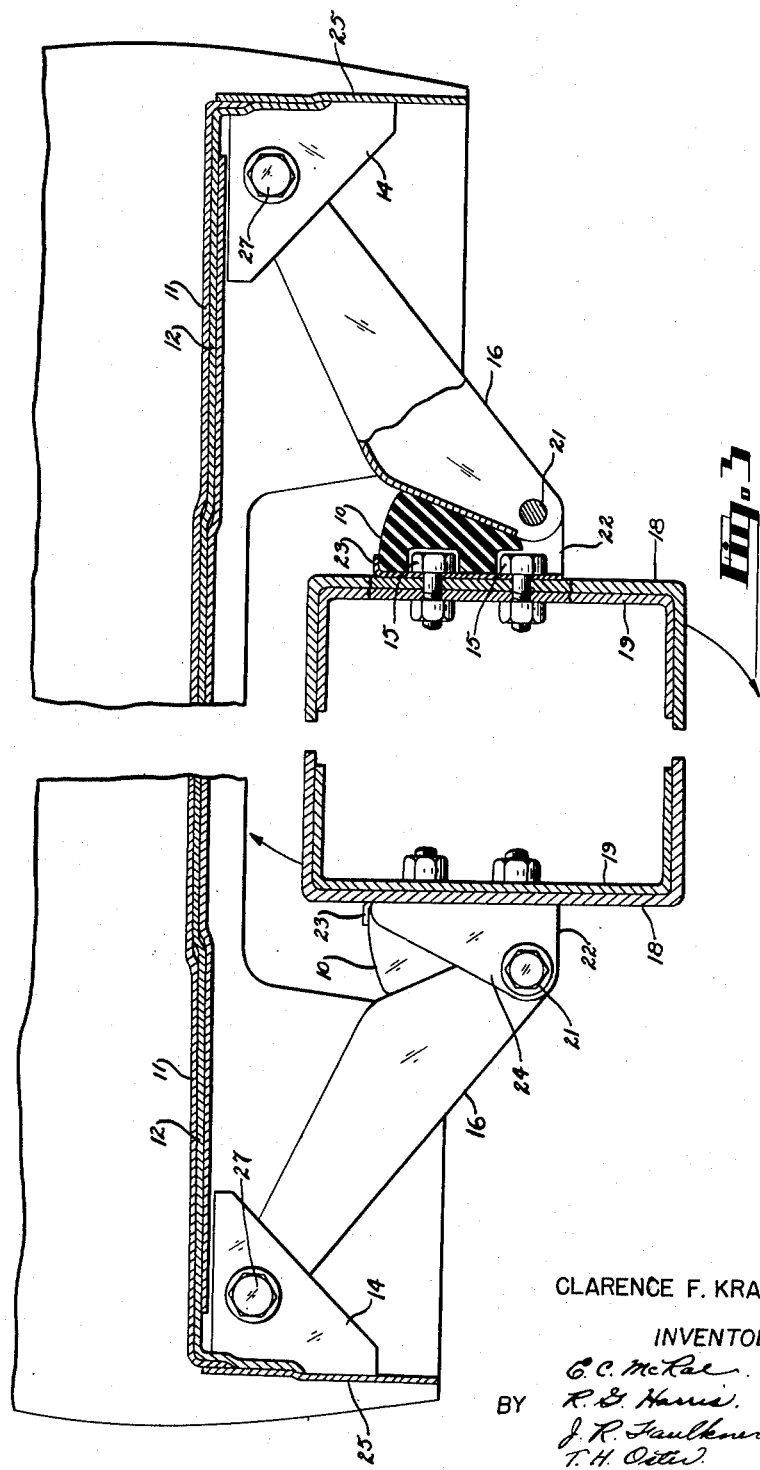
Figure 3 is an elevation partially in section of a pair of truck cab suspension means.
Figure 7:
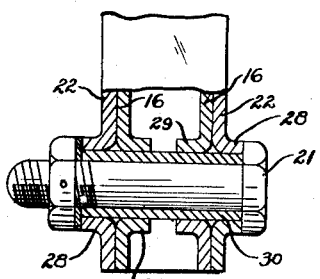
Figure 7 is a section showing a detail of the bearing used in the structures depicted in Figures 1 and 3.

Figure 3 is an elevation of the truck cab suspension assembly as applied to the rear edge of the cab. In this drawing for the sake of clarity the mid-section of the assembly has been broken away. The necessary resiliency is obtained from a pad 10 which is composed of rubber or a similar elastomer. This pad is in the form of a blunt wedge (Figure 1) and is provided with recesses 15 to accommodate the bolt heads which secure the frame bracket 22 to frame 18. This pad 10 is confined between and coacts with frame bracket 22 and suspension arm 16. Frame bracket 22 may be a steel stamping and is provided with upturned side ears 24 and similarly upturned end ear 23. These ears support pad 10 against lateral displacement and bulging as will be more fully explained hereinafter. This bracket is bolted to frame 18 which is locally strengthened by reinforcement 19. Frame bracket 22 has integrally formed bosses which given an adequate bearing surface to support bolt 21 and bushing 30 upon which revolves suspension arm 16. This particular bearing structure is shown in Figure 7 which is partially in section. Frame bracket 22 is shown provided with bosses 28 flared outwardly and suspension arm 16 with bosses 29 which are flared inwardly. These bosses are sized to accommodate bushing 30 which is held in place by bolt 21.

The upper end of suspension arm 16 is mounted in body bracket 14 which is securely welded to cab skirt 25 and turned down portions of cab sill 12 and cab floor 11. Body bracket 14 is also provided with integral bosses which provide a bearing surface for bolt 27 and an associated bushing in which revolves suspension arm 16. This bearing is similar to that shown in Figure 7.

In employing this type of mounting, the front edge of the cab is rigidly secured to the frame and the suspension described above employed on both sides at the rear of the cab. The operation of this mounting is thought to be clear from a consideration of Figure 3. Assuming road or load conditions which would cause the portion of the frame supporting the rear of the cab to rotate clockwise as indicated by the heavy arrows in Figure 3, the pad 10 in the right hand suspension would be compressed by a resultant, relative counterclockwise rotation of suspension arm 16. Such rotation of suspension arm 16 would of course compress pad 10 between suspension arm 16 and frame bracket 22. The end ear 23 and side ears 24 prevent lateral displacement or flow of the rubber in pad 10 during such compression. Of course, when load or road conditions change so as to reverse the direction of twist, the pad 10 in the left hand suspension would be compressed.

The compression of these pads 10 provide sufficient resiliency to avoid undesired twisting of the cab. To demonstrate the efficacy of this type of cab suspension, a truck so equipped was loaded to capacity. A jack was then placed under the left front wheel and this wheel raised until the right wheel was clear of the ground. Even with the frame twisted to this extent, there was no binding of the doors.

Figure 1:
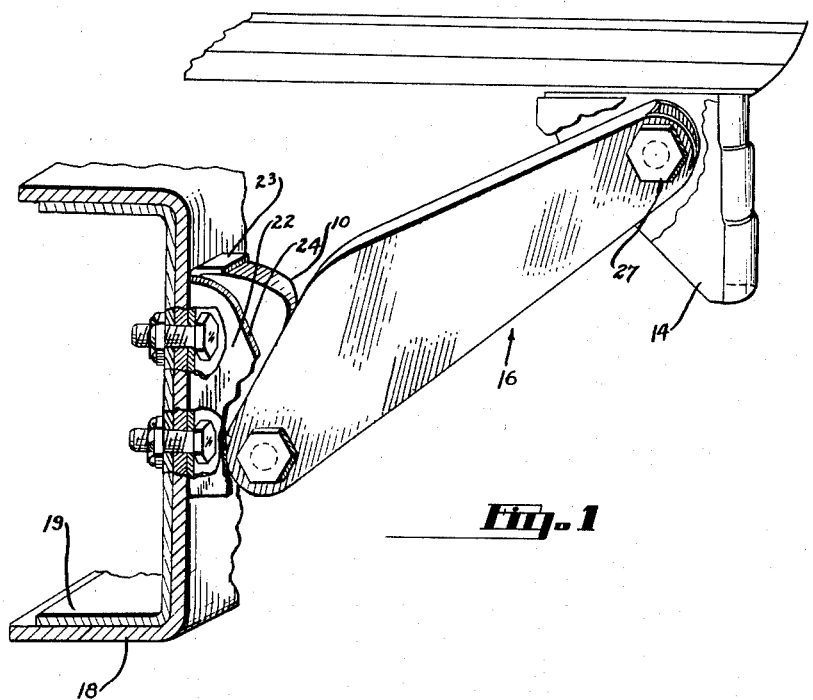
Figure 1 is a perspective view partially in section of a single truck cab suspension means.

Figure 1 is a perspective view of a right hand cab mounting. The numbering of this drawing is the same as Figure 3 explained above. This figure is thought to be self-explanatory.

Figure 2:
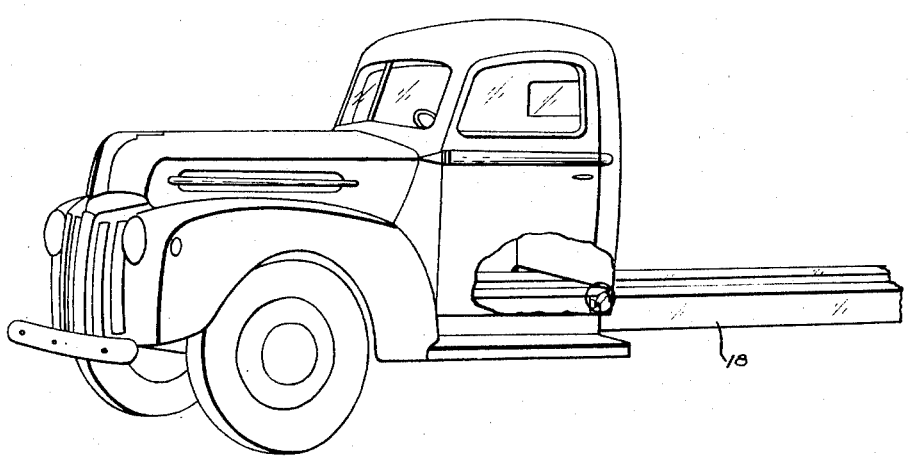
Figure 2 is a perspective view of a truck cab.

Figure 2 is a perspective view of a truck cab, the circled portion showing the location of the suspension depicted in Figure 1.

Figure 4:
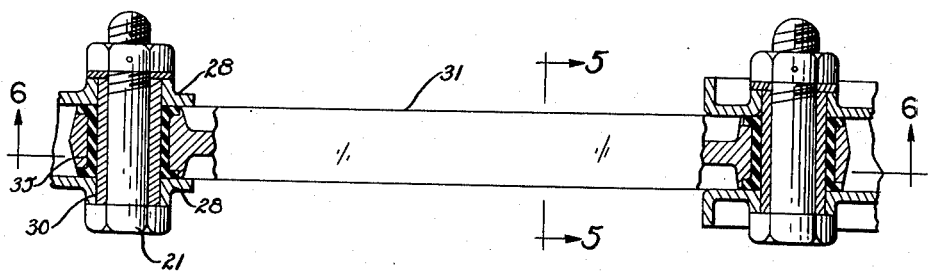
Figure 4 is a view partially in section of an alternate cab suspension means.
Figure 5:
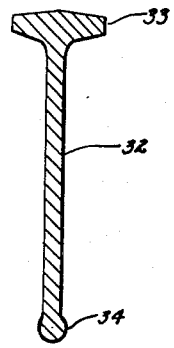
Figure 5 is a cross section of the cab suspension arm.
Figure 6:
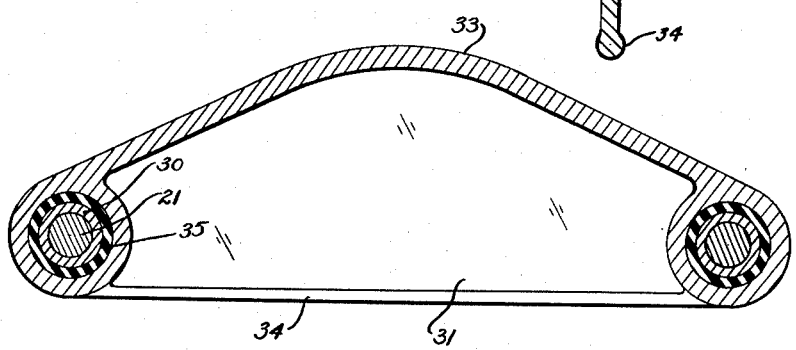
Figure 6 is a section of the structure shown in Figure 4 along the line 6—6.

Under certain circumstances it has been found advisable to substitute a forging or casting for stamped suspension arm 16. Figures 4, 5 and 6 are directed to a suspension arm which is either a forging or casting. Figure 5 is a section of this cast arm comprising a web 32, a flange 33 and a bead 34. The use of a cast or forged arm makes possible a somewhat more advantageous bearing structure than is possible with a stamped arm. This bearing structure is generally similar to that used with the stamped arm, employing frame bracket bosses 28, bolt 21 and bushing 30. It is distinguished therefrom by the use of a rubber grommet 35 which serves to insulate cast arm 31 from bushing 30.

I claim as my invention:

1. A vehicle body suspension comprising a rigid suspension arm connecting the vehicle body and frame, said suspension arm being pivotally connected to the body and frame and inclined at a substantial angle to both horizontal and vertical axes of the vehicle, one of the pivots upon which a suspension arm turns comprising a pin mounted in a receptacle containing a wedge shaped block of elastomer and having supporting members for lateral support of the elastomer, the small angle of the wedge shaped block of the elastomer approximating the angle included between the frame member and the suspension arm in the normal position, said suspension arm, pivot and elastomer being arranged so that rotation of the suspension arm toward the elastomer causes compression of the elastomer.

2. An automotive vehicle comprising a body and a frame, said body being rigidly mounted on the frame at two locations and being resiliently attached to the frame at two other locations through two suspension means each of which suspension means comprises a rigid suspension arm connecting the vehicle body and frame, said suspension arm being pivotally connected to the body and frame and inclined at a substantial angle to both horizontal and vertical axes of the vehicle, one of the pivots upon which the suspension arms turns comprising a pin mounted in a receptacle containing a wedge shaped block of elastomer and having supporting members for lateral support of the elastomer, the small angle of the wedge shaped block of the elastomer approximating the angle included between the frame member and the suspension arm in the normal position, said suspension arm, pivot and elastomer being arranged so that rotation of the suspension arm toward the elastomer causes compression of the elastomer.

3. A vehicle body suspension comprising a rigid suspension arm connecting the vehicle body and frame, said suspension arm being pivotally connected to the body and frame and inclined at a substantial angle to both horizontal and vertical axes of the vehicle, one of the pivots upon which a suspension arm turns comprising a pin supported by the frame adjacent a receptacle containing a wedge shaped block of elastomer and having supporting members for lateral support of the elastomer, the small angle of the wedge shaped block of elastomer approximating the angle included between the frame member and the suspension arm in the normal position, said suspension arm, pivot and elastomer being arranged so that rotation of the suspension arm toward the elastomer causes compression of the elastomer.

CLARENCE F. KRAMER.

REFERENCES CITED

The following references are of record in the file of this patent:

UNITED STATES PATENTS

| Number | Name | Date |
|--------|------|------|
| 635,763 | Fetzer | Oct. 31, 1899 |
| 1,653,580 | Mayer | Dec. 20, 1927 |
| 2,150,073 | Malott | Mar. 7, 1939 |
| 2,171,947 | Parker | Sept. 5, 1939 |

FOREIGN PATENTS

| Number | Country | Date |
|--------|---------|------|
| 497,189 | Germany | May 5, 1930 |